(12) United States Patent
Trantow

(10) Patent No.: US 9,161,168 B2
(45) Date of Patent: Oct. 13, 2015

(54) PERSONAL INFORMATION COMMUNICATOR

(71) Applicant: Wayne D. Trantow, Portland, OR (US)

(72) Inventor: Wayne D. Trantow, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 238 days.

(21) Appl. No.: 13/832,677

(22) Filed: Mar. 15, 2013

(65) Prior Publication Data

US 2014/0274143 A1    Sep. 18, 2014

(51) Int. Cl.
*H04W 24/00* (2009.01)
*H04W 4/02* (2009.01)

(52) U.S. Cl.
CPC ................... *H04W 4/023* (2013.01)

(58) Field of Classification Search
CPC ............................. H04W 4/02; H04W 4/023
USPC ............................... 455/456.3, 566
See application file for complete search history.

(56) References Cited

U.S. PATENT DOCUMENTS

| | | | |
|---|---|---|---|
| 8,312,392 B2 * | 11/2012 | Forutanpour et al. | 715/863 |
| 2014/0282066 A1 * | 9/2014 | Dawson et al. | 715/748 |

FOREIGN PATENT DOCUMENTS

| | | |
|---|---|---|
| JP | 2011-028780 A | 2/2011 |
| JP | 2013-033472 A | 2/2013 |
| KR | 10-2003-0096335 A | 12/2003 |
| KR | 10-2010-0115804 A | 10/2010 |

OTHER PUBLICATIONS

International Search Report and Written Opinion received for PCT Patent Application No. PCT/US2014/017906, mailed on Jun. 16, 2014, 10 pages.

* cited by examiner

*Primary Examiner* — Amancio Gonzalez
(74) *Attorney, Agent, or Firm* — Jordan IP Law, LLC

(57) ABSTRACT

A personal information communicator may include a remote device detector, a display, a remote device location detector, an information collection module, a presentation module, a selection module, a linking module, and an expression module. The remote device detector may receive an indicator from remote device(s) in an external region of space. The display may present a representation of a field of view of the region of space. The remote device location detector may determine the location of remote device(s). The information collection module may collect data associated with the remote device(s) within the field of view. The presentation module may present identifying information for each of the one or more remote devices on the display, the identifying information determined at least in part using the data. The selection module may pick selected remote device(s) from the remote device (s). The linking module may link to the selected remote device(s).

25 Claims, 10 Drawing Sheets

PERSONAL INFORMATION COMMUNICATOR

BACKGROUND

Computing devices and use models may constrain creative self-expression and communication. For example, conventional computing devices may be non-intuitive and inconvenient with regard to using mobile communications technology to manage information in both personal and professional lives.

BRIEF DESCRIPTION OF THE DRAWINGS

The various advantages of the embodiments will become apparent to one skilled in the art by reading the following specification and appended claims, and by referencing the following drawings, in which:

DETAILED DESCRIPTION

Figure 1:
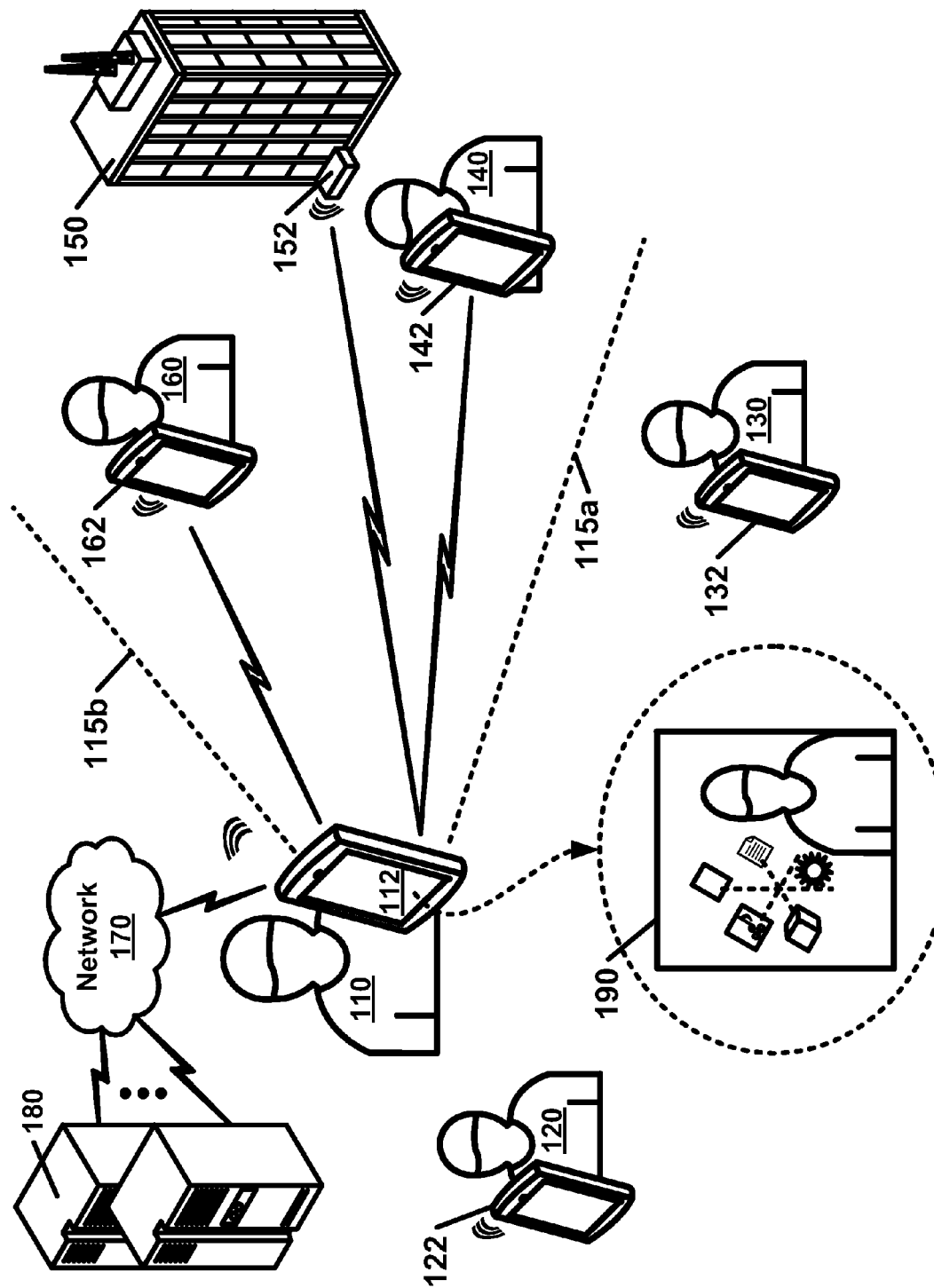
FIG. 1 is an example block diagram illustrating an apparatus interacting with multiple remote devices as per an aspect of an embodiment.

Embodiments may enable the sharing of personal information. Specifically, electronic devices may locate each other and share personal information such as creative representations, images, links, objects, icons, combinations thereof, and/or the like.

Handheld computing and communication devices (e.g., smartphones) may be used to identify a three-dimensional (3D) information storage and navigation space inherent to every person (e.g., the 3D space in front of a person's body where their eyes, ears, mouth and arms can coherently interact). Users may work within this space by moving a hand-held computing device to navigate among virtual information objects and control them via gesture and/or speech.

Embodiments may employ an information space management (e.g., Person Relative Information Space/PRIS) management to enhance information management and communication by extending the evolution of human interaction with computing and communication technology. In the beginning of the digital age, computers were physically large and rare and people subliminally perceived these machines as the residence and owner of the information (i.e., the machine was synonymous with the information). As technology evolved, machines became smaller, less imposing and more personal. With this evolution may have come a gradual loosening of the association of information ownership away from the machine and toward the person (i.e., "my personal device has my information"). Small, ubiquitous devices, Internet, wireless communications, data services, data storage, cloud computing etc., may have contributed to this disassociation. The information space management described herein may extend the disassociation from device to person.

Embodiments may create an illusion about a person by presenting a persona defined by the person on a device observing the person. This persona may occur by communicating information and expression(s) from a person's device to an observer's device. The information and associated expression(s) may be observed on the observer's device in the space (and possibly surrounding area) where the person's image would normally be displayed. In this way, the information and associated expression(s) may create and maintain an illusion that has the effect of dis-associating information from the device and associating it to the person. The effect may create an illusion for both for the owner of the information and for remote viewers.

The information space management may provide a persistent knowledge library and a public 'personality expression' space that may be physically associated with a user (or in some cases an object). People may cultivate this information space management over time in creative ways to create a unique extension of themselves. Some users may have very ordered information space management solutions that are filled with perfectly aligned rectangular icons in subdued colors, while another might create an information space management solution that is a free-form arrangement of neon colored lines that represent hot links to even more expression. In other words, the information space management may allow for the artistic self-expression while also providing a practical solution to managing information.

As a system, some of the various embodiments may include an 'augmented reality' service. This service may provide a useful illusion where information is viewed and managed. In a private aspect, embodiments may serve as a personal library. In a public or social aspect, embodiments may provide another aspect of personal expression.

Personal knowledge may be gained by maintaining a persistent library of information in a personal information space management solution that evolves over time. The library may have both private and public areas. Some of the various embodiments may allow users to focus the development and use public space. Additionally, personality and our social communications may be augmented by incorporating desired information into a public area. Through a variety of technologies discussed below, the public area may be viewed and interacted with by others to enhance social dynamics, to play games, to make collaboration easier and more intuitive, to enhance personal expression.

FIG. 1 is an example block diagram illustrating an apparatus interacting with multiple remote devices as per an aspect of an embodiment. A user 110 may employ an information space management enabled viewing device 112. Surrounding the user 110 may be a public information space. A public information space may include an two-dimensional (2D) rectangular plane positioned near a person (or object). The information space management is not limited, however, to 2D. In some implementations, objects in the information space may be represented. As illustrated in the example of FIG. 1, the field of view surrounding user 110 includes a user 120 (employing information space management enabled device 122), a user 130 (employing information space management enabled device 132), a user 140 (employing information space management enabled device 142), a building 150 (employing information space management enabled device 152), and a user 160 (employing information space management enabled device 162).

In this public information space management, the user 140 (employing information space management enabled device 142), the building 150 (employing information space management enabled device 152), and the user 160 (employing information space management enabled device 162) are located within a field of view (bordered by 115a and 115b). The field of view may be a subspace within the public information space. In some of the various embodiments, the information space management enabled device 112 may have a camera. The field of view may be defined by the field of view of the camera. There may be distinct modes of viewing on the local device. For example, in one viewing mode, both the local PRIS space and the actual field of view may be shown. In another viewing mode, only the field of view may be shown. In yet another mode, only the local PRIS space may be shown.

For convenient viewing information space management handheld devices may use a non-fixed camera lens, a ball-socket camera for example, such that the line of sight of camera lens is not fixed in a perpendicular orientation to the display screen. The user may manually swivel the lens (or a powered tracking mechanism could automatically maintain focus on a target) so that they could view looking downward at the display while camera is pointing outward toward target.

Handheld devices like smartphones may be used to display a public information space when pointed at an information space management-enabled person nearby. The other person's public information space management expression may be viewed on the receiver's display as a 2D wall of information objects. It is envisioned that information space management enabled devices may include electronic enabled eye-glasses that render another person's public information space as you pass on the street or if you are standing side-by-side. Other technologies such as holographic projection may be used to interact with an information space.

According to some of the various embodiments, an information space management system may be built with current technology, standards and components. For example, a system may be built that employs mobile broadband, Internet servers, smartphone cameras, displays, combinations thereof, and/or the like.

Some of the various embodiments may share some of the following elements: beaconing and discovery, target identification (signal to image association), target selection, target tracking, link control, presentation configuration, presentation rendering, combinations thereof, and/or the like.

Discovery, Selection and Tracking: A point-to-point communication channel may be setup between the public information space of a remote 'target' object to a local receiving 'viewer'. The P2P connection may be between two devices, but once one of the devices is selected by the other device, the connection may appear to be between the remote info space and the local viewing device. The common target may be a person, although it could also be an object like a house, historical monument, storefront, or moving vehicle. For example, user 110 may be a local viewer (employing information space management device 112) and the remote targets may be user 140 (employing information space management enabled device 142), building 150 (employing information space management enabled device 152), and user 160 (employing information space management enabled device 162). Several existing technologies may be combined to discover, select and track a remote information space management target.

Discovery: Peer-to-peer wireless technologies (P2PRF) such as WiFi-Direct may be employed to discover remote information space management target(s). The strength of the radio frequency (RF) signal from a P2PRF device may be used as an indication of a remote device location relative to the viewer's display screen. The antenna of the information space management viewing device may have both omni-directional and directional characteristics. An omni-directional antenna may pick up all signals near a viewer but may also possess a directional sensitivity that may be aligned with the path of a camera lens on the information space management viewing device. According to some of the various embodiments, this path may be perpendicular to the face of the viewer's handheld screen. In this context, the viewing device may assume that the strongest P2PRF signals are coming from the 'candidate' objects that appear on the handheld screen as seen through the camera lens.

Information space management devices may send beacon signals using RF transmission in the unlicensed RF band using Wifi-Direct, or similar point-to-point protocol. The RF transmissions may employ unidirectional antennas. Viewing information space management devices may detect nearby information space management-beaconing devices within a user-configurable directional range. An indicator may be provided to a viewing information space management device when one or more information space management targets are in-range.

Identification: After a viewing device detects target information space management device(s) in range, an indicator may be displayed. Using a handheld's camera, the information space management viewer may scan the landscape for remote information space management target(s). As the receiving user points his/her handheld in the direction of the target(s), the handheld camera may display an image of the scene that may include a variety of objects such as people, buildings, trees, statues, etc. Any target object that is information space management-enabled may broadcast a periodic beacon signal (such as per WiFi-Direct). Correlation of RF beaconing targets to images on the viewer's display may be achieved using directional RF sensors.

According to some of the various embodiments, the viewing device might also be able to correlate using global positioning system (GPS) or cell-tower-triangulation calculation to derive the absolute location of the target and compare it to its own location. In this scenario, the viewing device may also have a "compass" sensor so that it knows the direction the camera is pointing. The viewing device may use absolute location values and direction values to identify targets that the viewer is pointed towards. Target beacons may be associated to images on viewer's display using one or a combination of mechanisms. For example, a directional RF antenna/sensor that is oriented parallel to the line of sight of the devices camera lens may detect a set of in-range signals that are the strongest. Because the line of sight of the lens is parallel to field of detection (sensitivity pattern) of the RF sensor, an information space management enabled device may conclude that the target's image(s) are currently in the field of view of the camera hence are in the viewer's display. This mechanism may take into consideration the current zoom setting of the camera.

In another example, a mechanism that uses absolute location data from GPS or cell-tower-triangulation calculations may be employed. Location data may be sent in meta-data and may be used to determine the position of a target relative to the viewer's current GPS location. Viewing device(s) may have a compass that senses the geological direction the camera is pointing. The viewing device is then able to determine which target the camera is pointing toward. The result of using one or both of the above mentioned example beacon-to-image correlation mechanisms is a set of "candidate target shapes" that are highlighted on viewer's display.

Figure 2A:
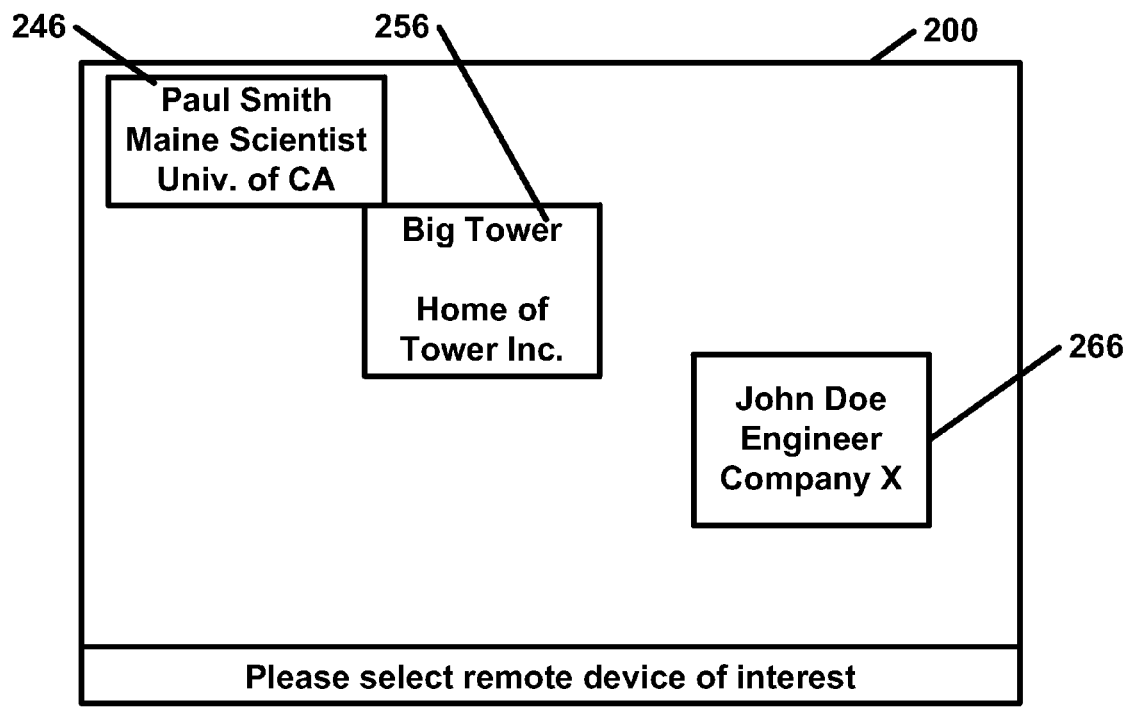
FIG. 2A through FIG. 4 illustrate example screens as per embodiments.

The viewing device may auto-associate beacon meta-data to images in the display to provide the user with a set of information space management target candidates to select for more detailed viewing. The information space management beacon may convey meta-data about a target's information space to help a remote viewer to correlate the beacon contents to the owner of the info space. Once a target is selected, the info space may be rendered from a source such as, for example, the cloud using a link in the meta-data. For example, FIG. 2A illustrates and example viewing screen 200 showing beacon meta-data for targets in the field of view, namely beacon metadata 246 for the user 140 (FIG. 1), beacon meta-data 256 for the building 150 (FIG. 1), and beacon metadata 256 for the user 160 (FIG. 1).

Meta-data in the beacon packet may convey taxonomy information such as: a primary/base type; a secondary type; a tertiary type level; an "Intro Greeting" or brief high level summary; current GPS coordinates; a link, combinations thereof, and/or the like. A primary/base type may indicate what type of object the information space management target is (e.g., "I am a Person", "I am a Storefront", "I am a Historical Marker", etc.). A secondary type may contain detail specifics to base type. For example, a Person Type may have: gender=male, height=6', hair color=brown, and potentially a low res photo, or a pattern of coordinates, and/or the like. The low resolution photo, or a pattern of coordinates may be useful for image recognition processing (i.e., a stored geometry coordinate set of a face used to correlate to the actual face seen through the viewer). In another example, a historical marker may have: shape=rectangle, and size=4'×6'. A tertiary type level may contain free-form "hints" such as, for example, "today I'm wearing a blue jacket." A link to an information space management web service may reference a location on a network (e.g. in the cloud) where additional information space management information (e.g. a full information space management profile) may be accessed. The discovery process may leverage parts of existing beaconing and discovery protocols, such as, UPNP (Universal Plug and Play).

Bumping Identification Method: Another method of setting up an information space management connection between viewer and target may include the act of physically bumping two information space management enabled devices together to setup a near field connection. This action may signal that an immediate selection and setup is desired (skipping the identification step). The bump may be detected employing an accelerometer or similar motion sensor. The information space management device may use this event as a signal to accept the strongest RF signal to display their beacon greeting. The user can confirm and accept a connection to the full information space management data. Bumping may generate a link layer transmission to a strongest RF signal, which may presumably be the closest device, which may presumably be the device that just bumped. This scenario may also imply that information space management info may to be shared bi-directionally, i.e., both devices are targets and viewers. This may be a common scenario. For example, two persons meeting for lunch connecting to share info in their PRIS with each other.

Association and Selection: The receiving person may read the meta-data text encoded in the remote information space management beacons to help with the association of candidate information space management targets to the various images on his/her screen. Using the type information and image recognition algorithms, the viewing information space management device may auto-associate the remote information space management objects to patterns on the viewing devices screen (as seen through the camera). Shapes may also be highlighted for the viewer. For example, if the information space management candidates in the display include "Person: Male", "Person:Female" and "Storefront:PetShop" types, the viewing information space management device may easily recognize and highlight the Storefront in the viewing screen using just the Base Type meta-data. Using secondary meta-data for persons, the viewing information space management device may likely distinguish between the female and male and highlight them. Highlighting might take many forms such as super-imposed rectangle frames similar to how digital cameras now indicate faces in the view finder.

Figure 2B:
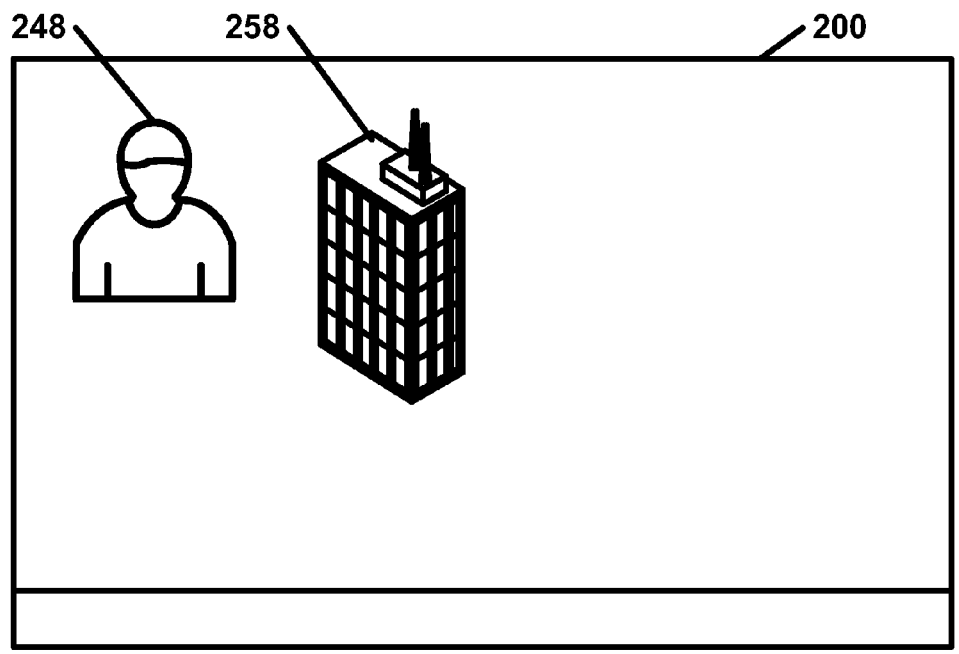

At this point, introductory level information may be displayed near highlighted candidates, i.e., a brief intro greeting. If the introductory information is interesting and/or is enough to confirm that the auto-association is correct, the viewer may tap the object to select it. This may result in a transmission of the target's full information space management display by accessing the link in the meta-data to an information space management cloud service. For example, FIG. 2B illustrates viewer display 200 with representations of two selected information space management targets, namely, a representation 248 of the user 140 (FIG. 1) and a representation 258 of the building 150 (FIG. 1). In an example modality of showing remote targets, the remotes targets may be presented on the screen as icons, facsimiles of the target, and/or the like. Another example modality of showing remote targets may include as showing a live camera view of the remote targets.

Viewing device(s) may provide a tap/click mechanism to select a specific target from candidate set to view the full information space management expression. The auto-association step may also add a unique identification word (or number) to each candidate target in the display so that the viewer can speak the word to select it via voice command.

At times the auto-association may be incorrect. This is less likely to occur across categories but may occur within the same categories of the taxonomy, most likely with the "Person" category. If the viewer discovers that the meta-data for the person doesn't match, he/she can select the option to "Refine the Discovery". In this stage, the viewing information space management device may re-correlate. The level of False Correlations (FC's) may directly correspond to: the accuracy of information contained in the metadata, the number of potential candidates in the viewfinder, and/or the like. The accuracy of information contained in the metadata leading to an FC may be the result of insufficient detail. Perhaps the information space management user did not completely fill in all fields, or gave misleading information. This may be resolved by the user themselves.

An information space management protocol may allow for a viewer to leave an FC message in the target's information space management to alert them to fix it. The sheer number of potential candidates in the viewfinder may also cause FC's. In a landscape where there is only one person in the view finder, there may be no FC's at all, but of course, in a very busy landscape with a lot of people in motion, auto-correlation may take one or more "refine" steps to correct it. Here, the information space management identification algorithm may leverage the standard 'zoom' feature of the viewing device's camera. In a crowded field the user may simply zoom in on the landscape and get the number of candidates down to just one or two. In more advanced systems, object recognition methodologies may be used to identify objects.

The discovery and association actions may be run in real-time to update viewing display as it is panned around. An accelerometer or similar motion sensor may be employed to detect movement and change in direction of viewing camera.

Link Control: According to some of the various embodiments, the full information space management data may not be communicated over the P2PRF connection(s), but instead over a standard web connection using standard web communication protocols like the simple object access protocol (SOAP). The established P2PRF connection may be used only for control operations, e.g., setup, tracking and disconnect. Returning now to FIG. 1, to display the full information space management information, the viewing device 112 may use information in the meta-data of the remotes 142, 152, and 162 to setup connection(s) to server(s) 180 through network (s) 170 where the selected target's full information space management profile may be hosted.

After the information space management viewer 110 selects an information space management target such as, for example, the person 140, the viewing device 112 may have implicit confirmation that the RF link is correctly associated to the image on the screen 190. In a tracking phase, the viewing device 112 may continue that association of image-to-target until the connection is terminated. Targets may be terminated explicitly by the viewer 110 with an explicit "deselect" click, or a "snapshot and exit" command. In other cases/embodiments, targets may be implicitly terminated by moving the target off-screen longer than a specified 'keep active' time. In yet other cases/embodiments, target(s) may be implicitly terminated because the target is moving out of sight range (a distance threshold).

Information space management information may include meta-data and various information or expression objects represented in 2D or 3D. Objects may be text objects, graphic objects, hot-link objects that trigger actions such as delivery of audio/video streams and animations.

Figure 3:
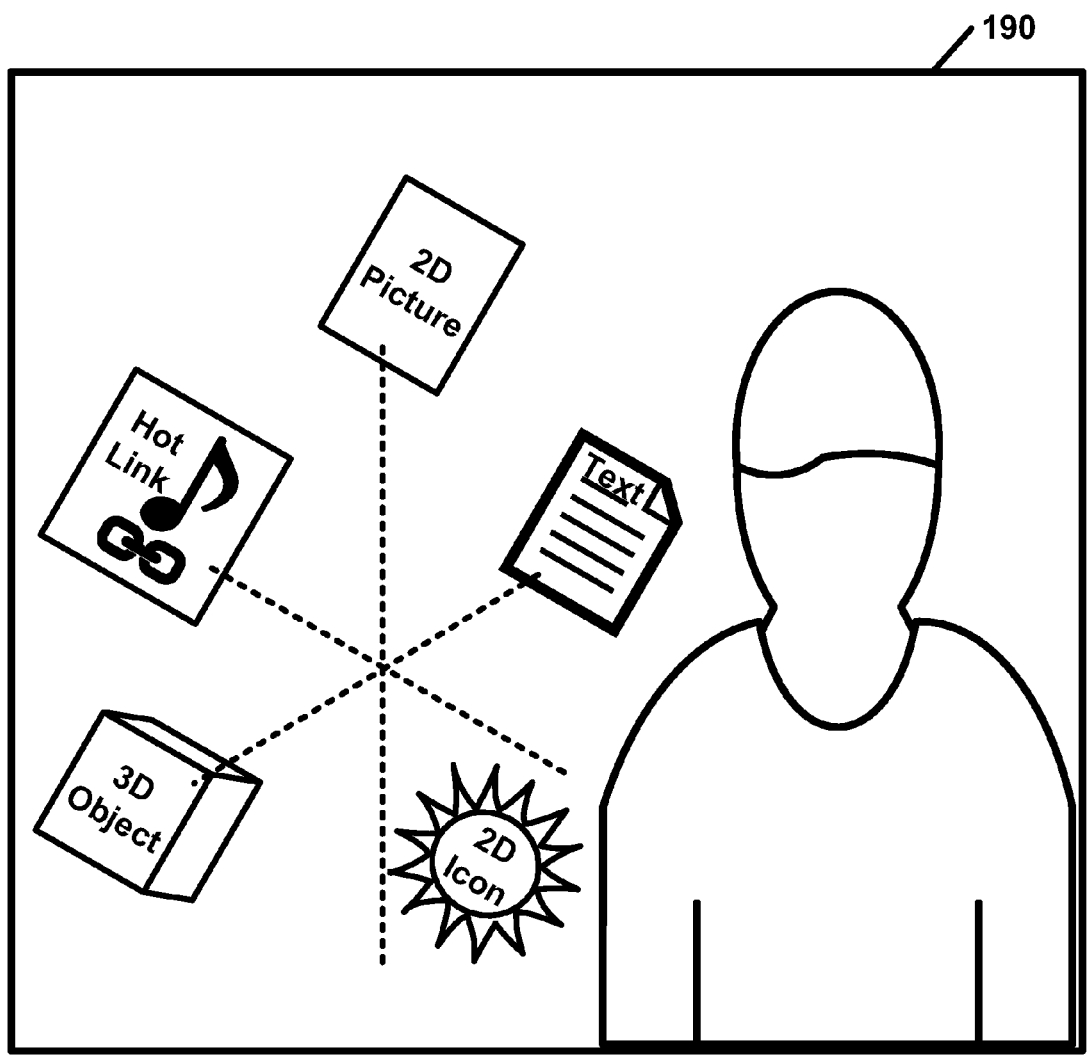

Configuration: An information space configuration and management tool may be employed to create and present creative expression, wherein an information space may be considered a virtual aura, virtual clothing or virtual jewelry. Information space management technology may bring that expression to life in a realistic way. In the information space management, a variety of icons, representing text objects, graphic objects, or link objects that trigger actions such as delivery of audio/video streams and animations, form that expression. FIG. 3 is an example illustration of the screen 190 (FIG. 1) on information space management viewing device 112 (FIG. 1) showing expressions of selected person 140 (FIG. 1).

An information space management presentation may be a collection of information objects that are created and positioned by the information space management owner. The presentation may be encoded a data structuring formats such as XML, Java Script Object Notation (JSON) and/or the like providing enough detail to allow a viewing device to render 2D and 3D images on viewer display in correct spatial orientation. In an information space management presentation, objects may be spatially positioned to one or more user-specified reference points. On a person, for example, two reference points might be used, center of face, side head profile for example, to help the viewing device more accurately render and position information space management objects.

The information space management viewing device may provide an object selection device, such as a cross-hairs to highlight a specific object and select it. Each object may have allowable actions specified in a profile such as an XML profile. For example, a picture object may allow a zoom in/out action, a music playlist object may allow play/stop actions, and/or the like.

Figure 4:
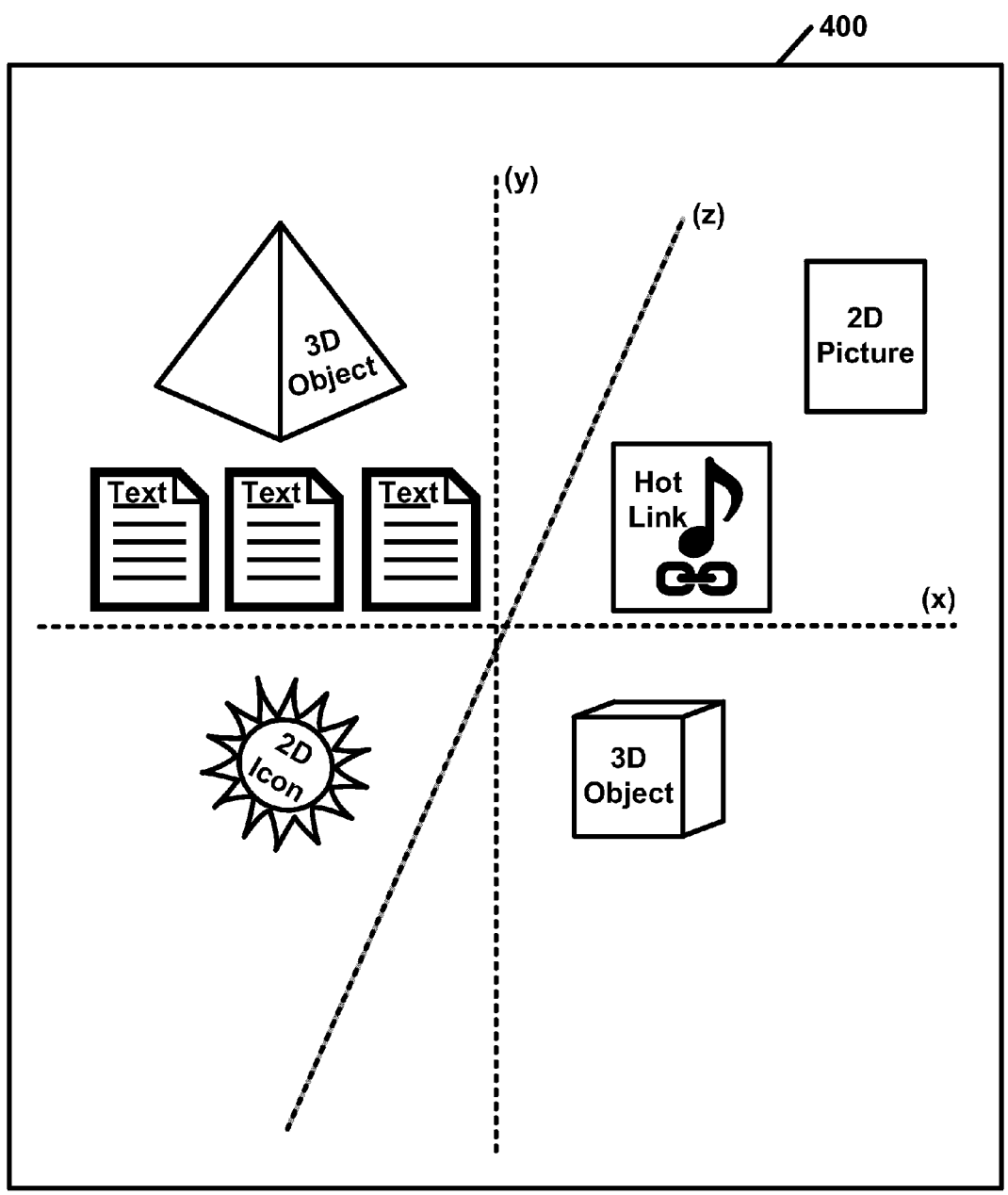

Configuration may be the part of the creative expression. According to some of the various embodiments, a basic 2D information space management "canvas" (rectangle plane) may be rendered semi-transparently on a target no matter how the target is oriented—like a sandwich-board. Objects may be represented by 2D graphic or text icons. According to some of the various embodiments, a 3D information space management "space" may be employed where a viewing device renders like a constellation of objects around the shape of the target (person or object), and takes into account the orientation of objects to the target, such that, the information space management objects may be rendered correctly when a target is viewed from different angles, e.g., front view, side view, back view. The icons may be 3D geometric forms. An example illustration of a screen 400 with expressions (representations) of a 3D information space management is shown in FIG. 4.

Solution: With continuing reference to FIG. 1, an information space management service provider may host and service a multitude of information space management users such as, for example, the users 110, 120, 130, 140, 150 and 160 on servers 180 via the network 170 (i.e., in the cloud). According to some of the various embodiments, information space management user(s) may have a profile configured to a standardized taxonomy and/or data structuring formats such as XML, Java Script Object Notation (JSON) and/or the like that determines how information objects appear to the viewer and are positioned relative to the owner.

A first example configuration model may create and/or modify an information space management using a rich drawing/design tool (think 3D-computer aided design/CAD or other design tool) where a user may create and position icons on a 2D canvas or in 3D space. The design tool may present a realistic model of the actual information space management owner (i.e., a person model, a storefront model, etc.) so that what is designed is an accurate model of what viewers will see in the field. Icons may be created from scratch or selected from libraries. This activity may occur on various computing systems configured to run the design tool.

A second configuration model may enable a user in the field to use their information space management-enabled handheld device to update basic aspects of the information space management on-the-fly such as making certain private objects public depending upon the viewer, or changing color and position of icons. Examples of field updating include: moving an information space management object between private space and publicly viewable space; changing attributes of objects, as permitted, such as its position, expression color, access rights to links, and/or the like; creating a new object and positioning it in the information space management; and turning an information space management beaconing on or off.

Display: The complement of the creative configuration aspect is displaying the information space management on a viewing device. Two example models include a 2D display and a 3D display. In the first example, a 2D information space management canvas may be employed. While its size may vary, the viewer may see a rectangular array of objects, like a desktop screen, floating in front of the target no matter which direction they are facing. The canvas may be semi-transparent so that the target may be seen behind the canvas of information space management objects. In the second example, information space management objects may be rendered in 3D and/or in an omni-directional orientation to the target. At configuration time information space management objects may be positioned relative to one or more reference points on the information space management display device. For an information space management-enabled person, the main reference point may be the person's face, specifically the nose point. Points in side and back views may also be used. Facial and pattern recognition algorithms may be employed to find these reference origins. Origins may be identified and tracked in real time so that the information space management objects can be rendered relative to them, omni-directionally, as the target moves. Compared to the 2D model, objects may not be constrained to be just in front of the person.

Static information space management Owners: Conceivably, any object that could be outfitted with a P2PRF transmitter could be information space management-enabled. The main use of information space management may be to enhance personal expression, but information space management technology may also augment the presence of non-human objects such as buildings, landscapes and even moving vehicles. In this sense, the information space management may be referred to as an Object Relative Information Spaces (ORIS).

Inanimate objects like buildings and landscapes may be enhanced with an information space management. Consider a statue in a museum, a historical building like the Roman Senate ruins, a landscape like a historical battlefield. All of these "targets" may serve up an information space management illusion to a viewer who selects them. For example, in the case of a statue in a museum, the viewer may point at a statue to see its public information space management, which would have detailed information about it. In another example, a tourist visiting ancient Rome may point their information space management device at the ancient Roman Senate building and see an artist's rendering super-imposed upon the ruins of what it looked when it was in use. In yet another example, a tourist in France staring across a WW1 battle field area, a monument or totem located on the field may render an information space management video, overlaying upon the landscape a historical video or animation of the battle that took place there. In the above examples, the information space management viewing device may implement identification and selection methods as described earlier, but it may also provide a capability to support panning across a landscape.

The inanimate information space management object may be assumed to be stationary and not moving like a Person object. Hence, instead of tracking a moving target, in an inanimate/static information space management scenario, support may be employed for moving (panning) a viewing device. To do so, the viewing information space management device may employ a motion sensing sensor, such as a MEMS accelerometer/gyro mechanism (or the like) to sense directional motion and a dead-reckoning algorithm to track the direction and orientation of the viewer's screen after it moves away from an initial homing orientation.

The homing point (i.e., origin) for inanimate information space managements may be indicated in a target's meta-data. For example, with a rectangular shaped historical placard, the meta-data might indicate that the upper-right corner is the origin. The viewing information space management device, using the camera and image recognition algorithms, may recognize a rectangle and thus find the origin. From this origin, the information space management viewing device may start super-imposing the information space management illusion (which may include a video stream) onto the placard's rectangle shape. If the information space management of the historical placard supports it, the viewer may be able to pan across the landscape behind the placard. As the viewer pans, the information space management device may calculate the viewing angle and play out a video overlay upon the real landscape to augment it, such as historical film footage taken from that spot many years before or a simulated animation. Points of interest in the far field of vision could be highlighted to the viewer.

Dynamic Information Space Solution Owners: Consider a dynamic non-human information space management object, for example, a car, bus or train. Shape recognition and tracking capabilities may be combined with configuration capabilities for information space management viewing devices for use with human targets and for use with static non-human targets it would likely have all the elements needed to work with moving non-human information space management targets.

Capture: One way to view a target's information space management is to capture it for later viewing. The viewing information space management device may provide the ability to take snapshot of the target with their super-imposed information space management expression either as a static picture (dead icons) or a dynamic picture where the picture is saved with all the information space management presentation objects active so that the viewer can click-into the icons to explore them after the target is gone from proximity.

Write: According to some of the various embodiments, an information space management may include an "inbox" or "wall" area to leave a message or comment. One of the various ways to accomplish this task is to employ a "write" operation from viewer to target that may communicate to the information space management service provider's server using an URL contained in the target's information space management meta-data. The viewer may type in a message and click "Send" to the selected information space management target. This may trigger a web service write operation. The target would see the messages on their information space management wall.

Security and Privacy: The viewer/target interaction may be configured for implicit security. The information space management owner may be given control over defining what is private vs. public information and control over who is permitted to access their information space management information. Security from a link layer up to the security of a person's information space management data at an information space management service provider may be handled by existing security standards and mechanisms. However, in some of the various embodiments, these mechanisms may be uniquely adapted to work with various information space management uses.

Owner-identifiers and hints may be included in meta-data that is used in the discovery/selection phase. According to some of the various embodiments, these may be are configured offline and/or dynamically altered in the field. They include both static and dynamic identifiers. Static identifiers may be base persistent attributes such as sex, height and weight, and/or the like. Dynamic identifiers may include attributes that may change from day to day, such as owner clothing color and type (i.e., today I'm wearing a long blue coat, a red t-shirt, etc.), or privacy/permission levels on any object in the information space management.

An information space management viewing device may access the selected target's public information space management presentation information using a web link (URL) in the meta-data. For example using a SOAP 'Get' call or an HTTP 'Get' call.

In operation, a target object's information space management presentation may be rendered upon a live image on viewer screen (as seen through camera). The information space management presentation may be super-imposed upon the information space management owner (e.g., person, object or landscape) that is in viewing screen. information space management presentation objects may be positioned on a 2D plane in a 3D space. According to some embodiments, objects may be super-imposed upon or around the target in a semi-transparent manner so that the target object or its information objects are not obscured by each other.

The target information space management presentation, as seen on the viewer's display, may be captured and saved for later viewing, i.e., "PRIS snapshots". This will be a common use model, i.e., scan→identify→select→snapshot then explore the target's information space management objects with live detection disabled, i.e., where viewer is no longer pointing at the target.

According to some embodiments, messages/comments may be communicated from a viewer device to an information space management target if write permission levels, configured by owner, permit it. Permission levels include: Post to My Account and Text Direct. Post to my Account may be a 'write' operation from viewing device to an "inbox" for target information space management account. In addition to text comments, attachments (e.g., pictures, links) may be posted to the "inbox". Text Direct may enable a target information space management to configure their phone number and allow direct text messages, and/or the like.

According to some embodiments, viewing information space management device(s) may use multiple reference points to super-impose the information space management presentation objects correctly. Using pattern recognition algorithms (i.e., facial recognition, profile recognition, etc.) the viewing device extrapolates in real-time the orientation of information space management objects to target's configured reference points. As target moves the display re-paints the objects so they are true to the owner's configuration.

According to some embodiments, physical entities may have an information space management. Entities may be described by an information space management taxonomy of owner types including: Person, Animal (Pet), Building (Store, Business, Home), Landscapes (Denoted by Sign), Vehicle, and more. Each entity is described by a formal, standardized taxonomy of shape attributes appropriate to the entity.

Figure 5:
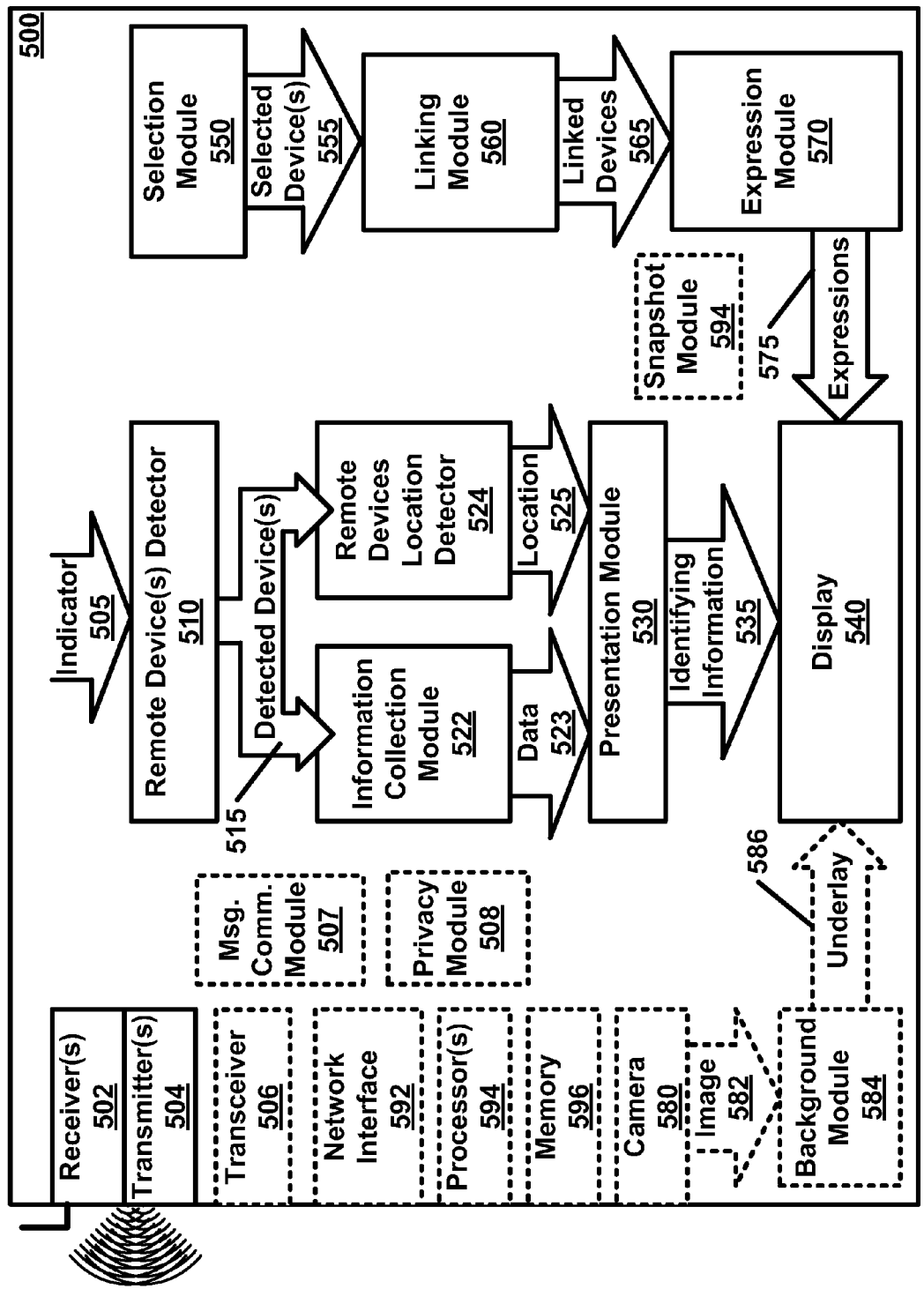
FIG. 5 is an example block diagram illustrating aspects of various embodiments.

FIG. 5 is an example block diagram of an embodiment of information space management device 500. The device 500 may include: a remote device detector 510, a display 540, a remote device location detector 524, an information collection module 522, a presentation module 530, a selection module 550, a linking module 550, and an expression module 570.

The remote device detector 510 may receive an indicator 505 from remote device(s) in a region of space external to the device 500. The indicator 505 may be a signal from remote device(s) identifying their presence to other information space management compatible devices. Some of the various embodiments may include a transmitter 504 to emit the beacon signal. In these embodiments, the indicator 505 may be a response from remote device(s) in response to the beacon signal. Receiver(s) 502 may be employed to receive detect the indicator 505.

The display 540 may present a representation of a field of view of the region of space. The display may be a stand-alone display or an integrated display. The remote device location detector 524 may determine the location 525 of the remote device(s) 515. The remote device location detector 524 may include or employ mechanisms to determine the location of remote device(s) relative to the device. Examples of such mechanisms include, but are not limited to: motion detector(s), directional antenna(s), directional sensor(s), GPS(s), near field communication device(s), compass(es), cell tower triangulation module(s), camera(s), pattern recognition module(s), face recognition module(s), profile detection module(s), location metadata interpretation module(s), accelerometer(s), combinations thereof, and/or the like.

The information collection module 522 may collect data 523 associated with the remote device(s) within the field of view. According to some of the various embodiments, the data 523 may include metadata. The metadata may be used to derive identifying information, expression(s), and/or the like. Identifying information may include an user identifier, a device identifier, a name, an identifying characteristic, and/or the like. According to some of the various embodiments, the data 523 may include objects. Examples of objects include: 2D images, 3D image(s), 2D object(s) (e.g. vector objects, 3D object(s), text object(s), graphic object(s), interactive object(s) (e.g. objects that change when selected such as interactive resumes or animations), hot-link object(s) (e.g. object(s) that resolves to a network available data such as a URL), XML object(s), combinations thereof, and/or the like.

The presentation module 530 may present identifying information 535 for each of the remote device(s) on the display 540. The identifying information 535 may be determined at least in part using the data 523. The selection module 550 may pick selected remote device(s) 555 from the remote device(s).

The linking module 560 may link device 500 to selected remote device(s) 555. A link includes that ability to download the data 523 such as final expressions for presentation. This may include groups of data 523 from device(s) based on the data 523. For example, a group of remote devices may present expressions together. This information may be included in metadata from the viewing information space management device. The expression module 570 may present expression(s) for linked remote device(s) 1065 to display 540. The expression may include rich information space management data such as animations, 3-D objects, links, combinations thereof, and/or the like.

Some of the various embodiments may include a camera 580 to capture an image(s) 582 of the field of view. The image(s) 582 may be still or moving. The image(s) may be used to locate objects or persons. Additionally, some of the various embodiments may include a background module 584 to present the image(s) 582 as an underlay image 586 on the display 540 under the expression(s) 575.

Some of the various embodiments may include a transceiver 506 to collect data 523 from remote device(s). A transceiver may be a communication device such as a cellular communications device, a Wi-Fi communications device, Bluetooth communications device, NFC communications device, nano communications device, and/or the like.

Additionally, some of the various embodiments may include a network interface to access network hosted data. The network hosted data may include data 523, a database of data for remote device(s) or device 500. The network hosted data may be directly accessed through a service, and/or through a link.

Some of the various embodiments may include a public/private module to selectively communicate private data only to one or more designated remote devices. For example, a device 500 may have privacy settings that only allow certain data to be shared with certain remote devices. Other data may be determined to be public and made freely available to all remote devices. The criterion for public vs. private status may be the type of remote device, remote devices that belong to a favorites list, remote devices that don't belong to a black list, and/or the like.

Some of the various embodiments may include memory devices 596. The memory 596 may be employed to hold operating system(s) and/or application(s). Additionally, some of the embodiments may use the memory device 596 to store history information or snapshots of expression(s). The snapshots may be managed by a snapshot manual 594. With a snapshot of expressions, a user may later review the expressions previously captured. Processor(s) 594 may be employed to execute the operating system(s) and/or the application(s). Some embodiments may operate with dedicated hardware that does not require the use of processor(s).

The creation of a Person Relative Information Space may be the complement of the Person Relative Information Space rendering. In a basic example case, a PRIS service may only support, or PRIS owner may only want, a 2D "sandwich board" expression to be seen in the field by viewers. Here the a Person Relative Information Space creation may be provided by an application that effectively pulls information objects onto a page (similar to when an object is placed onto a 2D rectangular plane or page in a graphics program) and encodes items such as: the absolute size of the object(s); the layout of the object(s) on a plane (e.g. as XY coordinates); shape, colors, shading attributes of the 2D icons/object(s); and/or the like. Metadata that describes this encoded data in a metadata format (e.g. XML or JSON) may be uploaded to a PRIS service account. The viewing device may decode the metadata and render the rectangle plane upon the person in a basic manner, i.e., semi-transparent and super imposed upon the person's mid-region for example, but may be the same whether the target is facing the viewer or has his/her back to the viewer.

Rich expression possibilities may be implemented if the PRIS service and rendering devices support a 3D layout of PRIS info objects. In some of the various embodiments, information objects, expressions objects, and attributes may be encoded so that they can be rendered to appear to be surrounding the PRIS owner with the element of a realistic perspective. So in these embodiments, a "constellation" of objects may be rendered that envelop the owner exactly how the owner wants them to be. Information and expression objects may appear as a constellation of discrete 3D objects, and/or as linear form(s) that thread around the owner (e.g. a helix, outline, and/or the like). Just like objects in a 2D sandwich board, the info objects may have attributes like geometry, size, color, shading and position. But here positioning may be expanded beyond what is available for 2D. In 2D, positioning may be represented in only two dimensions (e.g. an XY coordinate from the center of a flat plane). In 3D, an object may be positioned relative to a point, such as a person's nose. This point may be the center of an XYZ space.

According to some of the various embodiments, a rich application may allow a PRIS owner to create a constellation. The application may generate meta-data to describe a constellation so that a viewing device may render the meta-data accurately. If a viewer can only see the side or back of a PRIS target, a creation application may be able to encode a view from multiple angles such as from the front, side left, side right, and/or back to enable a viewing device to extrapolate the constellation in real-time to account for the spatial position of the target relative to the viewer.

Figure 10:
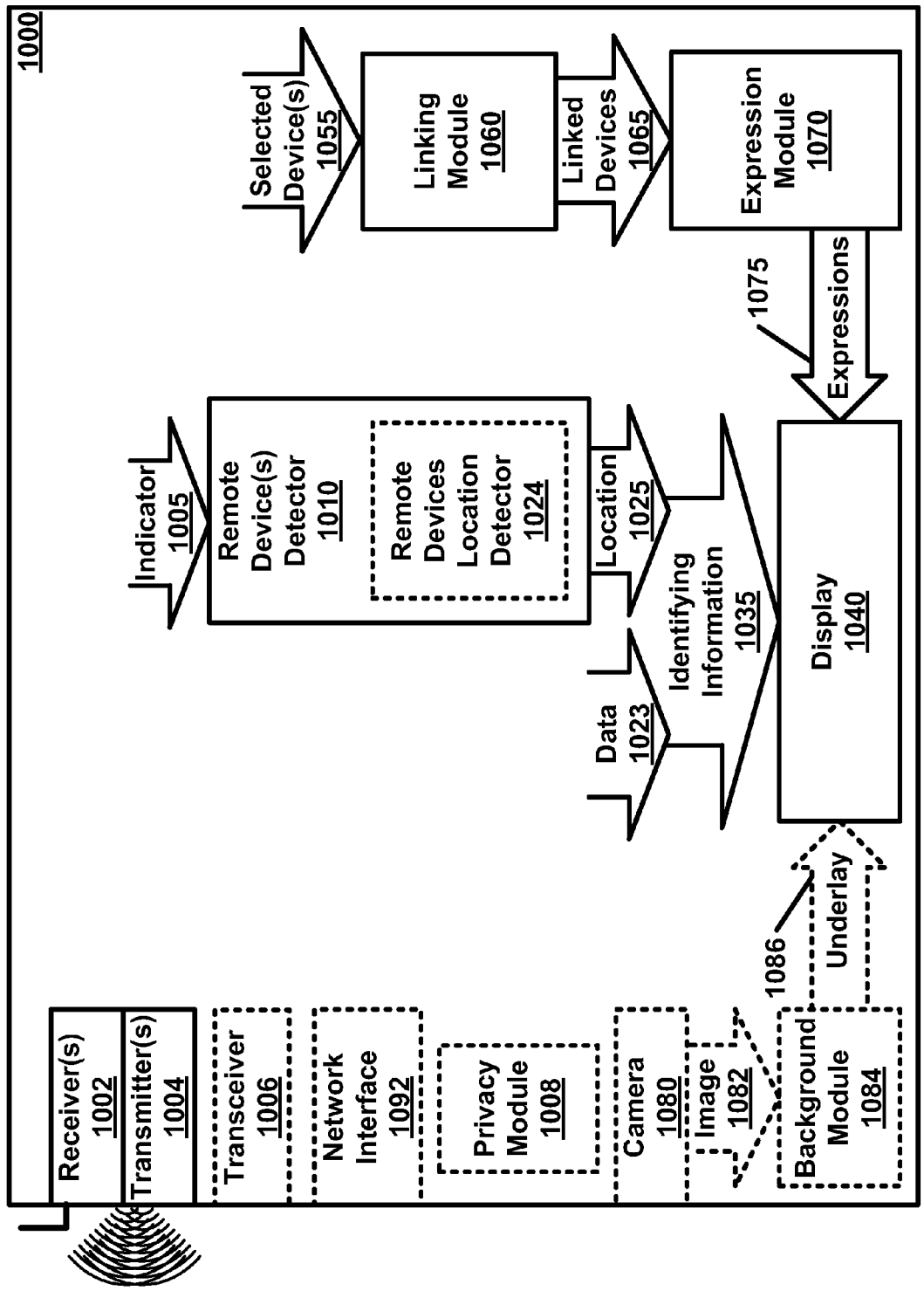
FIG. 10 is an example block diagram of an information space management device according to an embodiment.

FIG. 10 is another example block diagram of an embodiment of an information space management device 1000. The device 1000 may include: a remote device detector 1010, a display 1040, a linking module 1050, and an expression module 1070.

The remote device detector 1010 may determine a location of one or more remote device(s) within a field of view of a region of space external to the apparatus 1000 in response to receiving a received indicator 1005. The indicator 1005 may be a signal from remote device(s) identifying their presence to other information space management compatible devices. Some of the various embodiments may include a transmitter 1004 to emit the beacon signal. In these embodiments, the indicator 1005 may be a response from remote device(s) in response to the beacon signal. Receiver(s) 1002 may be employed to receive detect the indicator 1005.

The remote device detector 1010 may employ a remote device location detector 1024. The remote device location detector 1024 may determine the location 1025 of the remote device(s). The remote device location detector 1024 may include or employ mechanisms to determine the location of remote device(s) relative to the device. Examples of such mechanisms include, but are not limited to: motion detector(s), directional antenna(s), directional sensor(s), GPS(s), near field communication device(s), compass(es), cell tower triangulation module(s), camera(s), pattern recognition module(s), face recognition module(s), profile detection module(s), location metadata interpretation module(s), accelerometer(s), combinations thereof, and/or the like.

The display 1040 may present identifying information 1035 for each of the one or more remote device(s). The identifying information 1035 may be determined at least in part using data 1023 collected from the one or more remote device(s). The display may be a stand-alone display or an integrated display. According to some of the various embodiments, the data 1023 may include metadata. The metadata may be used derive identifying information, expression(s), and/or the like. According to some of the various embodiments, the data 1023 may include objects. Examples of objects include: 2D images, 3D image(s), 2D object(s) (e.g. vector objects, 3D object(s), text object(s), graphic object(s), interactive object(s) (e.g. objects that change when selected such as interactive resumes or animations), hot-link object(s) (e.g. object(s) that resolves to a network available data such as a URL, JSON, XML object(s), combinations thereof, and/or the like.

The linking module 1060 may link the device 1000 to selected remote device(s) 1055. A link includes that ability to download the data 1023 such as final expressions for presentation. This may include groups of data 1023 from device(s) based on the data 1023. For example, a group of remote devices may present expressions together. This information may be included in metadata from the viewing information space management device.

The expression module 1070 may present expression(s) for linked remote device(s) 1065 to display 1040. Expression(s) may include rich information space management data such as animations, 3-D objects, links, combinations thereof, and/or the like.

Some of the various embodiments may include a camera 1080 to capture an image(s) 1082 of the field of view. The image(s) 1082 may be still or moving. The image(s) may be used to locate objects or persons. Additionally, some of the various embodiments may include a background module 1084 to present the image(s) as underlay images 1086 on the display 1040 under the expression(s) 1075.

Some of the various embodiments may include a transceiver 1006 to collect data 1023 from remote device(s). A transceiver may be a communication device such as a cellular communications device, a Wi-Fi communications device, Bluetooth communications device, NFC communications device, nano communications device, and/or the like.

Additionally, some of the various embodiments may include a network interface to access network hosted data. The network hosted data may include data 1023, a database of data for remote device(s) or device 1000. The network hosted data may be directly accessed through a service, and/or through a link.

Some of the various embodiments may include a privacy module 1008 to selectively communicate private data only to one or more designated remote devices. For example, a device 1000 may have privacy settings that only allow certain data to be shared with certain remote devices. Other data may be determined to be public and made freely available to all remote devices. The criterion for public vs. private status may be the type of remote device, remote devices that belong to a favorites list, remote devices that don't belong to a black list, and/or the like.

Figure 6:
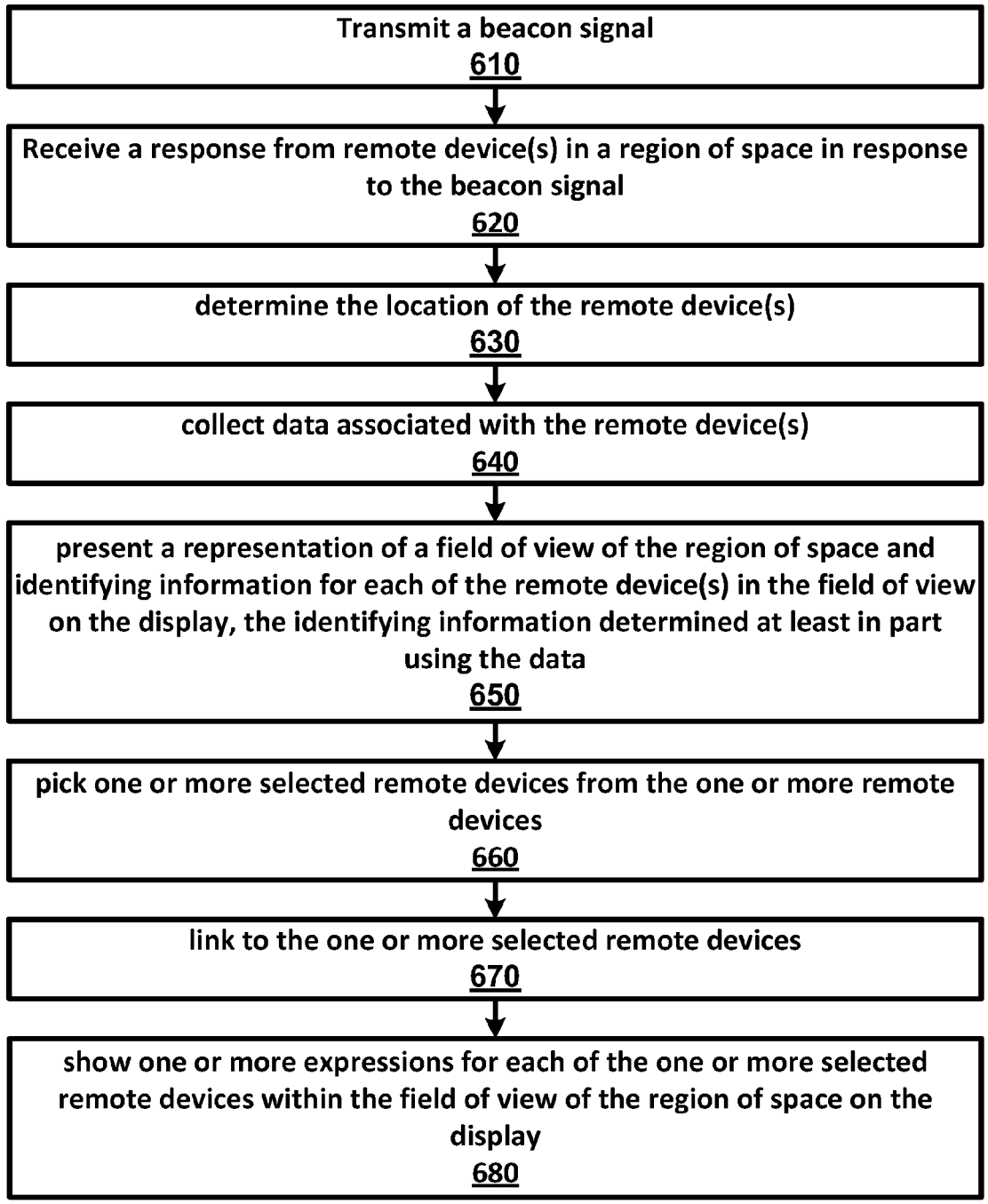
FIGS. 6 and 7 are example flow diagrams illustrating aspects of various embodiments.
Figure 7:
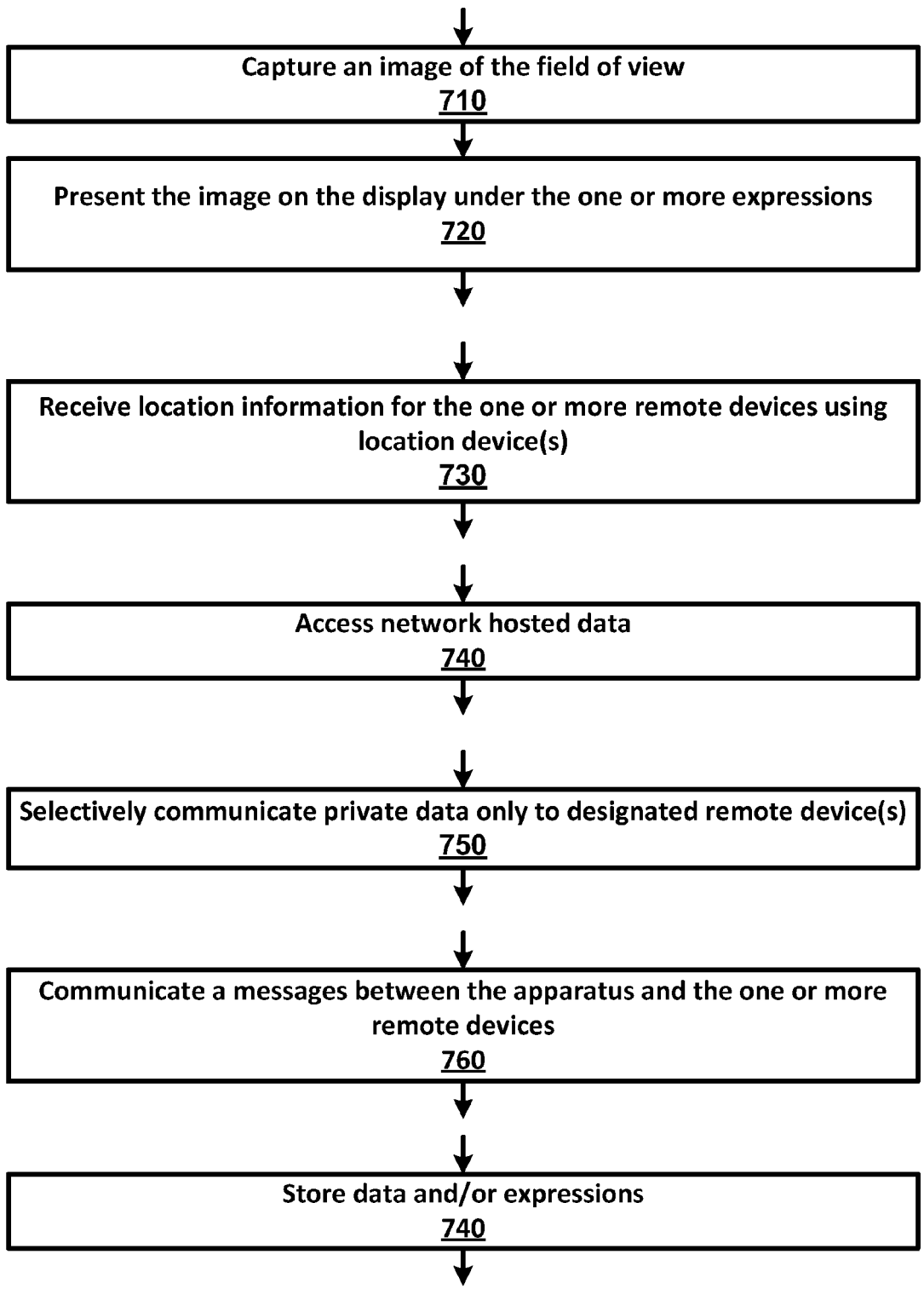

FIG. 6 and FIG. 7 are flow diagrams illustrating various actions that may be taken by various embodiments. The methods of FIGS. 6 and 7 may be implemented in executable software as a set of logic instructions stored in a machine- or computer-readable medium of a memory such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Thus, some of the actions in the flow diagrams may be implemented in some of the various embodiments employing non-processing hardware. Some of the actions in the flow diagrams may be implemented in some of the various embodiments employing processing hardware. In embodiments that employ processing hardware, parts of the flow diagram may be performed by processor(s) executing instructions stored on machine-readable medium(s). The processors may interact with additional non-processing hardware or processor hardware.

At block 610, a beacon signal may be transmitted. A response may be received from remote device(s) in a region of space in response to the beacon signal at block 620. The location of the remote device(s) may be determined at block 630. Data associated with remote device(s) may be collected at block 640. The data may include metadata. The identifying information, and/or expression(s) may be derived using the metadata. The metadata may include: owner information, a static identifier, a dynamic identifier, a photo, an image, descriptive information, an entity type, a schema, a URL, combinations thereof, and/or the like. The data may include one or more of the following objects: 2D image(s), 3D image (s), 2D object(s), 3D object(s), text object(s), graphic object (s), interactive object(s), hot-link object(s), XML object(s), a combination thereof, and/or the like.

According to some of the various embodiments, location information may be received for remote device(s) at block 730 from motion sensing mechanisms such as: motion detector(s), directional antenna(s), directional sensor(s), GPS(s), near field communication device(s), compass(es), cell tower triangulation module(s), camera(s), pattern recognition module(s), face recognition module(s), profile detection module (s), location metadata interpretation module(s), accelerometer(s), combinations thereof, and/or the like.

At block 650, a representation of a field of view of the region of space and identifying information for remote device (s) in the field of view on the display may be presented. The identifying information may be determined at least in part using the data.

Selected remote device(s) may be picked from remote device(s) at block 660. A link may be established to selected remote device(s) at block 670. Expression(s) for selected remote devices within the field of view of the region of space may be shown on the display at 680.

Some of the various embodiments may include a message communication module 507 (FIG. 5) may enable user to send and/or receive messages from other information space management enabled devices. Messages may be sent and/or stored in mailboxes. Additionally, messages may be posted to public areas such as a wall. Text messages may also be managed by the message communication module 507 (FIG. 5).

Some of the various embodiments may include a public/private module 508 (FIG. 5). Such a public/private module may manage which expressions and/or data is made publicly available or only made available to selected parties (i.e. private). Private data may be made available to select persons/objects based on a list, a type, and/or the like. In some cases, data may be made available to all parties accept those listed on a black list. In yet other cases, data may be made available to different information space management enabled devices based upon their content.

According to some of the various embodiments, an image of the field of view may be captured at block 710. The image may be presented on the display under expression(s) at block 720.

According to some of the various embodiments, the device may access network hosted data at block 740. The network hosted data may be in stored as part of a network information space management service. The network hosted data may be hosted by a local account or by a remote device. The network hosted data may be obtained by following a link provided by a remote device.

The device to selectively communicate private data only to one or more designated remote devices at block 750. The remote devices may be on a favorites list, or a member of an authorized group, etc. According to some of the various embodiments, the device may communicate message(s) with remote device(s). The messages may be left in an electronic mailbox, or posted on a wall, and/or the like.

Figure 8:
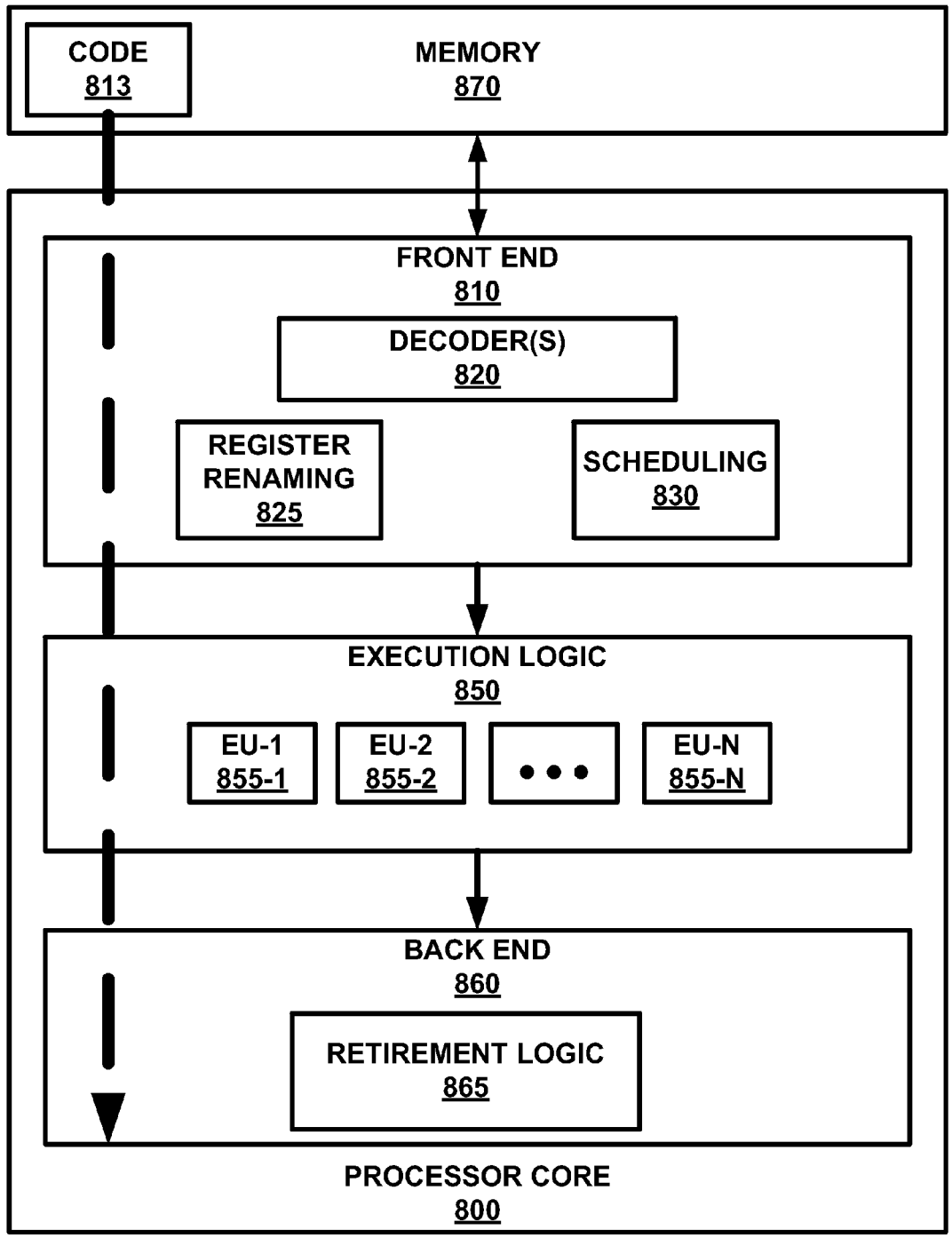
FIG. 8 is a block diagram of an example of a processor according to an aspect of an embodiment.

FIG. 8 illustrates a processor core 800 according to one embodiment. The processor core 800 may be the core for any type of processor, such as a micro-processor, an embedded processor, a digital signal processor (DSP), a network processor, or other device to execute code. Although only one processor core 800 is illustrated in FIG. 8, a processing element may alternatively include more than one of the processor core 800 illustrated in FIG. 8. The processor core 800 may be a single-threaded core or, for at least one embodiment, the processor core 800 may be multithreaded in that it may include more than one hardware thread context (or "logical processor") per core.

FIG. 8 also illustrates a memory 870 coupled to the processor 800. The memory 870 may be any of a wide variety of memories (including various layers of memory hierarchy) as are known or otherwise available to those of skill in the art. The memory 870 may include one or more code 813 instruction(s) to be executed by the processor 800 core, wherein the code 813 may implement the logic architecture illustrated in FIG. 6 through FIG. 8, already discussed. The processor core 800 follows a program sequence of instructions indicated by the code 813. Each instruction may enter a front end portion 810 and be processed by one or more decoders 820. The decoder 820 may generate as its output a micro operation such as a fixed width micro operation in a predefined format, or may generate other instructions, microinstructions, or control signals which reflect the original code instruction. The illustrated front end 810 also includes register renaming logic 825 and scheduling logic 830, which generally allocate resources and queue the operation corresponding to the convert instruction for execution.

The processor 800 is shown including execution logic 850 having a set of execution units 855-1 through 855-N. Some embodiments may include a number of execution units dedicated to specific functions or sets of functions. Other embodiments may include only one execution unit or one execution unit that can perform a particular function. The illustrated execution logic 850 performs the operations specified by code instructions.

After completion of execution of the operations specified by the code instructions, back end logic 860 retires the instructions of the code 813. In one embodiment, the processor 800 allows out of order execution but requires in order retirement of instructions. Retirement logic 865 may take a variety of forms as known to those of skill in the art (e.g., re-order buffers or the like). In this manner, the processor core 800 is transformed during execution of the code 813, at least in terms of the output generated by the decoder, the hardware registers and tables utilized by the register renaming logic 825, and any registers (not shown) modified by the execution logic 850.

Although not illustrated in FIG. 8, a processing element may include other elements on chip with the processor core 800. For example, a processing element may include memory control logic along with the processor core 800. The processing element may include I/O control logic and/or may include I/O control logic integrated with memory control logic. The processing element may also include one or more caches.

Figure 9:
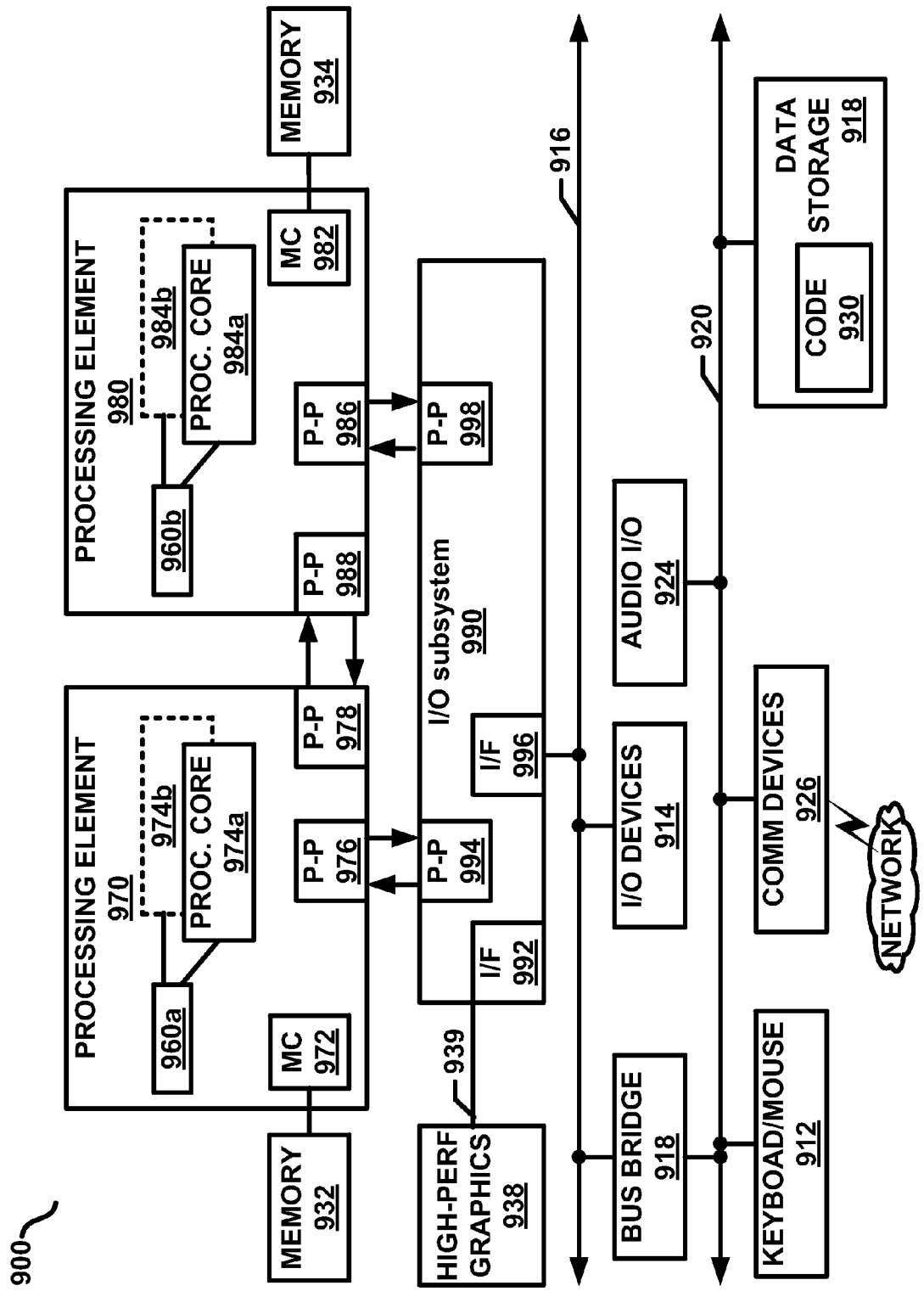
FIG. 9 is a block diagram of an example of a system according to an aspect of an embodiment.

Referring now to FIG. 9, shown is a block diagram of a system embodiment 900 in accordance with an embodiment. Shown in FIG. 9 is a multiprocessor system 900 that includes a first processing element 970 and a second processing element 980. While two processing elements 970 and 980 are shown, it is to be understood that an embodiment of system 900 may also include only one such processing element.

System 900 is illustrated as a point-to-point interconnect system, wherein the first processing element 970 and second processing element 980 are coupled via a point-to-point interconnect 950. It should be understood that any or all of the interconnects illustrated in FIG. 9 may be implemented as a multi-drop bus rather than point-to-point interconnect.

As shown in FIG. 9, each of processing elements 970 and 980 may be multicore processors, including first and second processor cores (i.e., processor cores 974a and 974b and processor cores 984a and 984b). Such cores 974, 974b, 984a, 984b may be configured to execute instruction code in a manner similar to that discussed above in connection with FIG. 9.

Each processing element 970, 980 may include at least one shared cache 960. The shared cache 960a, 960b may store data (e.g., instructions) that are utilized by one or more components of the processor, such as the cores 974a, 974b and 984a, 984b, respectively. For example, the shared cache may locally cache data stored in a memory 932, 934 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof While shown with only two processing elements 970, 980, it is to be understood that the scope is not so limited. In other embodiments, one or more additional processing elements may be present in a given processor. Alternatively, one or more of processing elements 970, 980 may be an element other than a processor, such as an accelerator or a field programmable gate array. For example, additional processing element(s) may include additional processors(s) that are the same as a first processor 970, additional processor(s) that are heterogeneous or asymmetric to processor a first processor 970, accelerators (such as, e.g., graphics accelerators or digital signal processing (DSP) units), field programmable gate arrays, or any other processing element. There can be a variety of differences between the processing elements 970, 980 in terms of a spectrum of metrics of merit including architectural, microarchitectural, thermal, power consumption characteristics, and the like. These differences may effectively manifest themselves as asymmetry and heterogeneity amongst the processing elements 970, 980. For at least one embodiment, the various processing elements 970, 980 may reside in the same die package.

First processing element 970 may further include memory controller logic (MC) 972 and point-to-point (P-P) interfaces 976 and 978. Similarly, second processing element 980 may include a MC 982 and P-P interfaces 986 and 988. As shown in FIG. 9, MC's 972 and 982 couple the processors to respective memories, namely a memory 932 and a memory 934, which may be portions of main memory locally attached to the respective processors. While the MC logic 972 and 982 is illustrated as integrated into the processing elements 970, 980, for alternative embodiments the MC logic may be discrete logic outside the processing elements 970, 980 rather than integrated therein.

The first processing element 970 and the second processing element 980 may be coupled to an I/O subsystem 990 via P-P interconnects 976, 986 and 984, respectively. As shown in FIG. 9, the I/O subsystem 990 includes P-P interfaces 994 and 998. Furthermore, I/O subsystem 990 includes an interface 992 to couple I/O subsystem 990 with a high performance graphics engine 938. In one embodiment, bus 949 may be used to couple graphics engine 938 to I/O subsystem 990. Alternately, a point-to-point interconnect 939 may couple these components.

In turn, I/O subsystem 990 may be coupled to a first bus 916 via an interface 996. In one embodiment, the first bus 916 may be a Peripheral Component Interconnect (PCI) bus, or a bus such as a PCI Express bus or another third generation I/O interconnect bus, although the scope is not so limited.

As shown in FIG. 9, various I/O devices 914 such as sensor (s) may be coupled to the first bus 916, along with a bus bridge 918 which may couple the first bus 916 to a second bus 910. In one embodiment, the second bus 920 may be a low pin count (LPC) bus. Various devices may be coupled to the second bus 920 including, for example, a keyboard/mouse 912, communication device(s) 926 (which may in turn be in communication with a computer network, not shown), and a data storage unit 918 such as a disk drive or other mass storage device which may include code 930, in one embodiment. The code 930 may include instructions for performing embodiments of one or more of the methods described above. Thus, the illustrated code 930 may implement the logic architecture illustrated in FIG. 5 and could be similar to the code 813 (FIG. 8), already discussed. Further, an audio I/O 924 may be coupled to second bus 920.

Note that other embodiments are contemplated. For example, instead of the point-to-point architecture of FIG. 9, a system may implement a multi-drop bus or another such communication topology. Also, the elements of FIG. 5 may alternatively be partitioned using more or fewer integrated chips than shown in FIG. 9.

Additional Notes and Examples

Examples may include an apparatus having a remote device detector, a display, a linking module and an expression module. The remote detector may determine a location of one or more remote devices within a field of view of a region of space external to the apparatus in response to receiving a received indicator. The display may present identifying information for each of the one or more remote devices. The identifying information may be determined at least in part using data collected from the one or more remote devices. The linking module may link to the one or more selected remote devices. The expression module may present one or more expressions for each of the one or more selected remote devices.

The apparatus may further include a transmitter to emit a beacon signal and wherein the indicator is a response from one or more remote devices in response to the beacon signal. The apparatus may further include a camera to capture an image of the field of view. The apparatus may further including a background module to present the image on the display under the one or more expressions.

The remote device detector may employ a remote device location detector. The remote device location detector may include one or more of the following: a motion detector; a directional antenna; a directional sensor; a GPS; a near field communication device; a compass; a cell tower triangulation module; a camera; a pattern recognition module; a face recognition module; a profile detection module; a location metadata interpretation module; and an accelerometer.

The apparatus may further include a transceiver to collect data from the one or more remote devices. The data may include metadata and one or more of the following may be derived using the metadata: the identifying information; and the one or more expressions. The data may include one or more of the following objects: a 2D image; a 3D image; a 2D object; a 3D object; a text object; a graphic object; an interactive object; a hot-link object; and an XML objects.

The apparatus may further include a network interface to access network hosted data. The apparatus may further include a privacy module to selectively communicate private data only to one or more designated remote devices.

According to another example, at least one machine-readable medium may comprise one or more instructions which, if executed by a computing device, cause the computing device to perform defined actions. The location of the one or more remote devices may be determined in a field of view of a region of space in response to a beacon signal. A representation of a field of view of the region of space and identifying information for each of the one or more remote devices in the field of view may be presented. The identifying information may determine at least in part using the data collected from the one or more remote devices. The one or more selected remote devices may be linked. One or more expressions for each of the one or more selected remote devices within the field of view on the display may be shown. Further, device may capture an image of the field of view and present the image on the display under the one or more expressions. The device may receive location information for the one or more remote devices from one or more of the following: a motion detector; a directional antenna; a directional sensor; a GPS; a near field communication device; a compass; a cell tower triangulation module; a camera; a pattern recognition module; a face recognition module; a profile detection module; a location metadata interpretation module; and an accelerometer. The data may include metadata and one or more of the following may be derived using the metadata: the identifying information; and the one or more expressions. The metadata may include one or more of: owner information; a static identifier; a dynamic identifier; a photo; an image; descriptive information; entity type; schema; and a URL. The data may include one or more of the following objects: a 2D image; a 3D image; a 2D object; a 3D object; a text object; a graphic object; an interactive object; a hot-link object; and an XML objects.

The device may further access network hosted data. The device may further selectively communicate private data only to one or more designated remote devices. The device may further communicate a message with the one or more remote devices.

According to another example, the location of one or more remote devices in a field of view of a region of space may be determined in response to receiving a received indicator. A representation of a field of view of the region of space and identifying information for each of the one or more remote devices on a display may be presented. The identifying information may be determined at least in part using the data collected from the one or more remote devices. One or more selected remote devices may be linked. One or more expressions for each of the one or more selected remote devices within the field of view on the display may be shown. Further, an image of the field of view may be captured and the image presented on the display under the one or more expressions. Further, location information may be received for the one or more remote devices from one or more of the following: a motion detector; a directional antenna; a directional sensor; a GPS; a near field communication device; a compass; a cell tower triangulation module; a camera; a pattern recognition module; a face recognition module; a profile detection module; a location metadata interpretation module; and an accelerometer.

The data may include metadata and one or more of the following may be derived using the metadata: the identifying information; and the one or more expressions. The data may include one or more of the following objects: a 2D image; a 3D image; a 2D object; a 3D object; a text object; a graphic object; an interactive object; a hot-link object; and an XML objects. Further, network hosted data may be accessed.

According to another example, an apparatus may comprise: a remote device detector, a display, a linking module, and an expression module. The remote device detector may determine a location of one or more remote devices within a field of view of a region of space external to the apparatus in response to receiving a received indicator. The display may present identifying information for each of the one or more remote devices. The identifying information may be determined at least in part using data collected from the one or more remote devices. The linking module may link to the one or more selected remote devices. An expression module may present one or more expressions for each of the one or more selected remote devices.

The apparatus may further include a transmitter to emit a beacon signal and wherein the indicator may be a response from one or more remote device(s) in response to the beacon signal. The apparatus may further include a camera to capture an image of the field of view. The apparatus may further include a background module to present the image on the display under the one or more expressions.

The remote device detector may employ a remote device location detector. The remote device location detector may include one or more of the following: a motion detector; a directional antenna; a directional sensor; a GPS; a near field communication device; a compass; a cell tower triangulation module; a camera; a pattern recognition module; a face recognition module; a profile detection module; a location metadata interpretation module; and an accelerometer. The data may include metadata and one or more of the following may be derived using the metadata: the identifying information;

and the one or more expressions. The data may include one or more of the following objects: a 2D image; a 3D image; a 2D object; a 3D object; a text object; a graphic object; an interactive object; a hot-link object; and an XML objects.

The apparatus may further include a transceiver to collect data from the one or more remote devices. The apparatus may further include a network interface to access network hosted data. The apparatus may further include a privacy module to selectively communicate private data only to one or more designated remote devices.

In another example, an apparatus to share information may comprise a remote device detector to determine a location of one or more remote devices within a field of view of a region of space external to the apparatus in response to receiving a received indicator; a display to present identifying information for each of the one or more remote devices, the identifying information to be determined at least in part using data collected from the one or more remote devices, a linking module to link to the one or more selected remote devices, and an expression module to present one or more expressions for each of the one or more selected remote devices. The apparatus may further include a transmitter to emit a beacon signal and wherein the indicator may be a response from one or more remote devices in response to the beacon signal. The apparatus may further include a camera to capture an image of the field of view. The apparatus may further include a background module to present the image on the display under the one or more expressions.

The remote device detector may employ a remote device location detector. The remote device location detector may include one or more of the following: a motion detector; a directional antenna; a directional sensor; a GPS; a near field communication device; a compass; a cell tower triangulation module; a camera; a pattern recognition module; a face recognition module; a profile detection module; a location metadata interpretation module; and an accelerometer. The data may include metadata and one or more of the following may be derived using the metadata: the identifying information; and the one or more expressions. The data may include one or more of the following objects: a 2D image; a 3D image; a 2D object; a 3D object; a text object; a graphic object; an interactive object; a hot-link object; and an XML objects.

The apparatus may further include a transceiver to collect data from the one or more remote devices. The apparatus may further include a network interface to access network hosted data. The apparatus may further include a privacy module to selectively communicate private data only to one or more designated remote devices.

According to another example, an apparatus to share information, may comprise a means for determining the location of the one or more remote devices in a field of view of a region of space in response to a beacon signal, a means for presenting a representation of a field of view of the region of space and identifying information for each of the one or more remote devices in the field of view, the identifying information determined at least in part using the data collected from the one or more remote devices, a means for linking to the one or more selected remote devices, and a means for showing one or more expressions for each of the one or more selected remote devices within the field of view on the display.

The apparatus may further include a means for capturing an image of the field of view and presenting the image on the display under the one or more expressions. The apparatus may further include a means for receiving location information for the one or more remote devices from one or more of the following: a motion detector; a directional antenna; a directional sensor; a GPS; a near field communication device; a compass; a cell tower triangulation module; a camera; a pattern recognition module; a face recognition module; a profile detection module; a location metadata interpretation module; and an accelerometer. The apparatus may further include a means for accessing network hosted data. The apparatus may further include a means for selectively communicating private data only to one or more designated remote devices. The apparatus may further include a means for causing the device to communicate a message with the one or more remote devices.

The data may include metadata and one or more of the following may be derived using the metadata: the identifying information; and the one or more expressions. The metadata may include one or more of: owner information; a static identifier; a dynamic identifier; a photo; an image; descriptive information; entity type; schema; and a URL. The data may include one or more of the following objects: a 2D image; a 3D image; a 2D object; a 3D object; a text object; a graphic object; an interactive object; a hot-link object; and an XML objects.

Some examples include a method to share information. One or more remote devices in a field of view of a region of space may be located in response to receiving a received indicator. A representation of a field of view of the region of space and identifying information for each of the one or more remote devices may be presented on a display. The identifying information determined at least in part using the data collected from the one or more remote devices. One or more selected remote devices may be linked. One or more expressions for each of the one or more selected remote devices within the field of view on the display may be shown. Further, capturing an image of the field of view may be captured and the image presented on the display under the one or more expressions. Further, location information may be received for the one or more remote devices from one or more of the following: a motion detector; a directional antenna; a directional sensor; a GPS; a near field communication device; a compass; a cell tower triangulation module; a camera; a pattern recognition module; a face recognition module; a profile detection module; a location metadata interpretation module; and an accelerometer. Further, network hosted data may be accessed.

The data may include metadata and one or more of the following may be derived using the metadata: the identifying information; and the one or more expressions. The data may include one or more of the following objects: a 2D image; a 3D image; a 2D object; a 3D object; a text object; a graphic object; an interactive object; a hot-link object; and an XML objects.

In this specification, "a" and "an" and similar phrases are to be interpreted as "at least one" and "one or more." References to "an" embodiment in this disclosure are not necessarily to the same embodiment.

Many of the elements described in the disclosed embodiments may be implemented as modules. A module is defined here as an isolatable element that performs a defined function and has a defined interface to other elements. The modules described in this disclosure may be implemented in hardware, a combination of hardware and software, firmware, wetware (i.e., hardware with a biological element) or a combination thereof, all of which are behaviorally equivalent. For example, modules may be implemented using computer hardware in combination with software routine(s) written in a computer language (such as C, C++, Fortran, Java, Basic, Matlab or the like) or a modeling/simulation program such as Simulink, Stateflow, GNU Octave, or LabVIEW MathScript. Additionally, it may be possible to implement modules using physical hardware that incorporates discrete or programmable analog, digital and/or quantum hardware.

Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies may be used in combination to achieve the result of a functional module.

Some embodiments may employ processing hardware. Processing hardware may include one or more processors, computer equipment, embedded system, machines and/or the like. The processing hardware may be configured to execute instructions. The instructions may be stored on a machine-readable medium. According to some embodiments, the machine-readable medium (e.g. automated data medium) may be a medium configured to store data in a machine-readable format that may be accessed by an automated sensing device. Examples of machine-readable media include: magnetic disks, cards, tapes, and drums, punched cards and paper tapes, optical disks, barcodes, magnetic ink characters and/or the like.

In addition, it should be understood that any figures that highlight any functionality and/or advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

As used in this application and in the claims, a list of items joined by the term "one or more of" can mean any combination of the listed terms. For example, the phrases "one or more of A, B or C" can mean A; B; C; A and B; A and C; B and C; or A, B and C.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. An apparatus to share information, comprising:
a remote device detector to determine a location of one or more remote devices within a field of view of a region of space external to the apparatus in response to receiving an indicator;
a display to present identifying information for each of the one or more remote devices, the identifying information to be determined at least in part based on data collected from the one or more remote devices;
a linking module to link to the one or more selected remote devices; and
an expression module to present at the display one or more expressions for each of the one or more selected remote devices.

2. The apparatus according to claim 1, further including a transmitter to emit a beacon signal and
wherein the indicator is transmitted from one or more remote device(s) in response to the beacon signal.

3. The apparatus according to claim 1, further including a camera to capture an image of the field of view.

4. The apparatus according to claim 3, further including a background module to present the image on the display under the one or more expressions.

5. The apparatus according to claim 1, wherein the remote device detector employs a remote device location detector, the remote device location detector including one or more of a motion detector, a directional antenna, a directional sensor, a global positioning system (GPS), a near field communication device, a compass, a cell tower triangulation module, a camera, a pattern recognition module, a face recognition module, a profile detection module, a location metadata interpretation module, or an accelerometer.

6. The apparatus according to claim 1, wherein the data includes metadata and at least one of the identifying information; and the one or more expressions is derived from the metadata.

7. The apparatus according to claim 1, wherein the data includes one or more of a two-dimensional (2D) image, a three-dimensional (3D) image, a 2D object, a 3D object, a text object, a graphic object, an interactive object, a hot-link object, or an XML object.

8. The apparatus according to claim 1, further including a transceiver to collect data from the one or more remote devices.

9. The apparatus according to claim 1, further including a network interface to access network hosted data.

10. The apparatus according to claim 1, further including a privacy module to selectively communicate private data only to one or more designated remote devices.

11. At least one non-transitory machine-readable medium comprising one or more instructions which, if executed by a computing device, cause the computing device to:
determine the location of the one or more remote devices in a field of view of a region of space in response to receiving a beacon signal;
present a representation of the field of view of the region of space and identifying information for each of the one or more remote devices in the field of view, the identifying information determined at least in part based on the data collected from the one or more remote devices;
link to the one or more selected remote devices; and
show one or more expressions for each of the one or more selected remote devices within the field of view on the display.

12. The medium according to claim 11, wherein the instructions, if executed, further cause the device to capture an image of the field of view and present the image on the display under the one or more expressions.

13. The medium according to claim 11, wherein the instructions, if executed, further cause the device to receive location information for the one or more remote devices from one or more of a motion detector, a directional antenna, a directional sensor, a global positioning system (GPS), a near field communication device, a compass, a cell tower triangulation module, a camera, a pattern recognition module, a face recognition module, a profile detection module, a location metadata interpretation module, or an accelerometer.

14. The medium according to claim 11, wherein the data includes metadata and at least one of the identifying information; and the one or more expressions is derived from the metadata.

15. The medium according to claim 11, wherein the metadata includes one or more of owner information, a static identifier, a dynamic identifier, a photo, an image, descriptive information, entity type, schema, or a universal resource locator (URL).

16. The medium according to claim 11, wherein the data includes one or more of a two-dimensional (2D) image, a three-dimensional (3D) image, a 2D object, a 3D object, a text object, a graphic object, an interactive object, a hot-link object, or an XML object.

17. The medium according to claim 11, wherein the instructions, if executed, further cause the device to access network hosted data.

18. The medium according to claim 11, wherein the instructions, if executed, further cause the device to selectively communicate private data only to one or more designated remote devices.

19. The medium according to claim 11, wherein the instructions, if executed, further cause the device to communicate a message with the one or more remote devices.

20. A method of sharing information, the method comprising:
    determining the location of one or more remote devices in a field of view of a region of space in response to receiving an indicator;
    presenting a representation of a field of view of the region of space and identifying information for each of the one or more remote devices on a display, the identifying information determined at least in part based on the data collected from the one or more remote devices;
    linking to the one or more selected remote devices; and
    displaying one or more expressions for each of the one or more selected remote devices within the field of view on the display.

21. The method according to claim 20, further including capturing an image of the field of view and presenting the captured image on the display under the one or more expressions.

22. The method according to claim 20, further including receiving location information for the one or more remote devices from one or more of a motion detector, a directional antenna, a directional sensor, a global positioning system (GPS), a near field communication device, a compass, a cell tower triangulation module, a camera, a pattern recognition module, a face recognition module, a profile detection module, a location metadata interpretation module, or an accelerometer.

23. The method according to claim 20, wherein the data includes metadata and one or more of the identifying information and the one or more expressions is derived based on the metadata.

24. The method according to claim 20, wherein the data includes one or more of a two-dimensional (2D) image, a three-dimensional (3D) image, a 2D object, a 3D object, a text object, a graphic object, an interactive object, a hot-link object, or an XML object.

25. The method according to claim 20, further including accessing network hosted data.

* * * * *